United States Patent [19]
Hale et al.

[11] Patent Number: 5,098,498
[45] Date of Patent: Mar. 24, 1992

[54] APPARATUS AND METHOD FOR ENCAPSULATING CONTOURED ARTICLES

[75] Inventors: Steven E. Hale, Waterville; James W. Sherman, Sylvania; Daniel J. Batdorf, Perrysburg, all of Ohio

[73] Assignee: Manville Corporation, Denver, Colo.

[21] Appl. No.: 419,227

[22] Filed: Oct. 10, 1989

[51] Int. Cl.⁵ ............. B29C 51/10; B29C 51/14; B29C 65/02

[52] U.S. Cl. ................... 156/213; 156/286; 156/290; 156/301; 156/324; 156/499; 156/552; 156/562

[58] Field of Search ............ 156/212, 213, 285, 286, 156/324, 382, 499, 552, 562, 564, 216, 301, 290; 428/76, 74; 53/511, 408, 433, 450

[56] References Cited

U.S. PATENT DOCUMENTS

| | | | |
|---|---|---|---|
| 1,908,682 | 5/1933 | Bronson | 156/285 |
| 2,750,719 | 6/1956 | Wandelt | 53/22 |
| 2,824,364 | 2/1958 | Bovenkerk | 156/285 |
| 3,072,520 | 1/1963 | Groth | 156/286 |
| 3,313,084 | 4/1967 | Forman | 53/22 |
| 3,364,648 | 1/1968 | Lemelson | 53/42 |
| 3,495,992 | 2/1970 | De For | 53/450 |
| 3,546,846 | 12/1970 | Sens | 53/511 |
| 3,805,486 | 4/1974 | Mahaffy et al. | 425/388 |
| 4,455,809 | 6/1984 | Dallaserra | 53/450 |
| 4,726,974 | 2/1988 | Nowobilski et al. | 428/74 |
| 4,824,507 | 4/1989 | D'Amico | 156/245 |
| 4,824,714 | 4/1989 | Gest | 156/62.2 |
| 4,880,680 | 11/1989 | Kistner | 428/76 X |

*Primary Examiner*—Michael W. Ball
*Assistant Examiner*—Steven D. Maki
*Attorney, Agent, or Firm*—John Lister; Cornelius P. Quinn

[57] ABSTRACT

A method and apparatus for encapsulating a porous article in plastic film without employing supporting molds. The article is deposited onto a lower web and an upper web is moved into overlying position. The edges of the webs are gripped by moving teeth to move the webs and the article in unison. The webs are then pinched together adjacent the article to form an enclosed volume. The film is heated to its fusing temperature and the enclosed volume is evacuated through a tube inserted through the lower web and into the article. The tube is removed and the fused webs are trimmed adjacent the edges of the article, resulting in an encapsulated article.

23 Claims, 4 Drawing Sheets

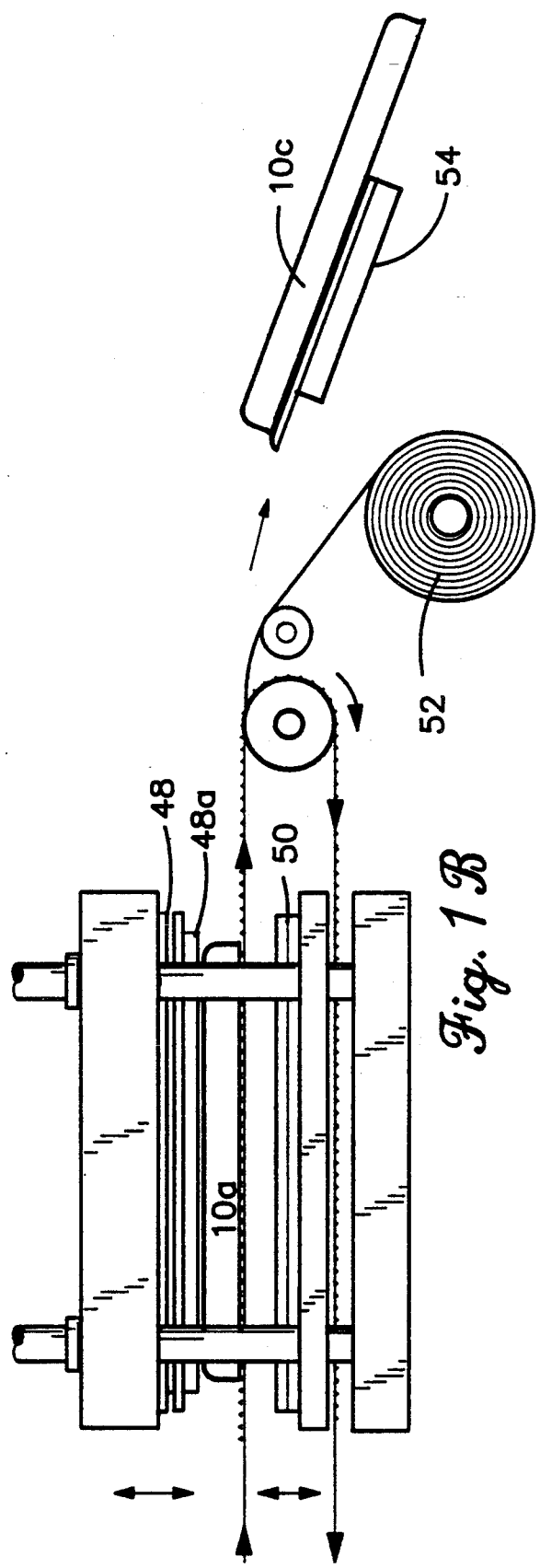
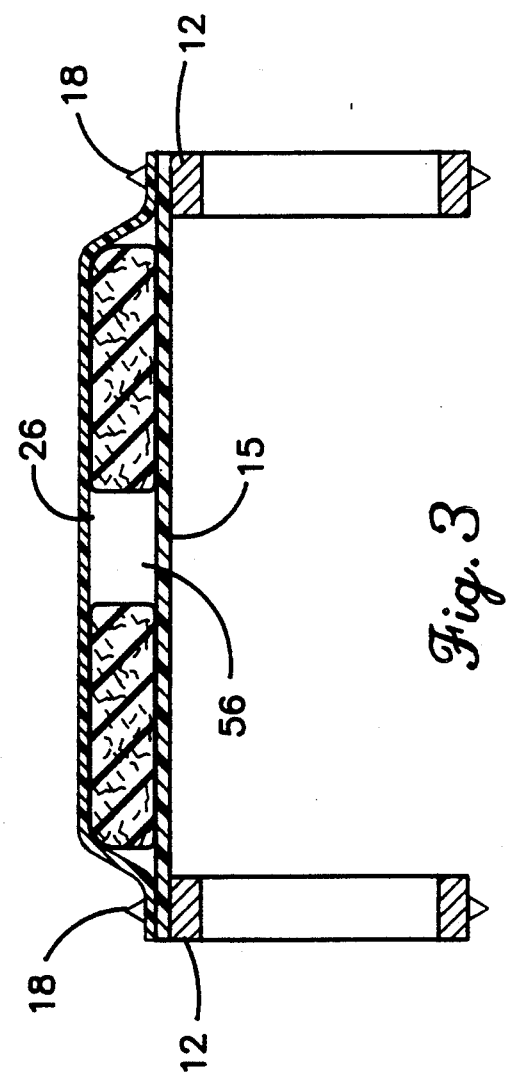

APPARATUS AND METHOD FOR ENCAPSULATING CONTOURED ARTICLES

FIELD OF THE INVENTION

This invention relates to a method of encapsulating an article in a plastic film. More particularly, it relates to apparatus and the method of encapsulating a contoured article, such as a pre-molded highly porous fiber glass article, in a thin plastic film on all surfaces by means of heating and vacuum-forming the film to the contoured article. This invention relates generally to the invention described in co-pending U.S. patent application Ser. No. 224,639 filed July 27, 1988 now abandoned, both being assigned to a common assignee.

BACKGROUND OF THE INVENTION

Vacuum forming is typically used for forming thick (50–120 mils) heat-deformable articles such as plastic refrigerator door liners. Additionally, vacuum forming is a common method of encapsulating one or more articles within a plastic film material, usually for the purpose of shipping the articles as a package. Techniques for wrapping articles by this method are well known and are distinct from heat-shrink wrapping of articles. In a vacuum forming operation plastic film material, having a thickness in the range of 10–100 miles, is softened by heat and formed to the desired shape by vacuum, whereas in shrink wrapping the film is heated to cause it to shrink about an article. Although the plastic material used in a vacuum forming operation may shrink slightly during the process, perhaps in the order of a few percent of its original size, it is insignificant compared to the shrinkage of film in a shrink wrap operation where the film may readily shrink 75% in the main direction and 30% in the cross direction.

There are reasons other than for ease of handling for wrapping articles with plastic film, one being to prevent fibrous articles from releasing fibers to the environment. An example is in the manufacture of automobile hoodliners formed of fiber glass. Such hoodliners are shaped by molding and trimming a bonded fiber glass mat to the contour of an automobile hood. Workers in the assembly line who are located beneath installed hoodliners are at times exposed to fibers broken and released from such fiber glass hoodliners, particularly if the hoodliners are subjected to vibration or shock. As a way of eliminating this, it has been suggested to encapsulate the fiber glass hoodliners in a thin film. The contoured shape of hoodliners, however, raises problems.

To encase a hoodliner in a plastic film by the shrink-wrap method would be too expensive due to the type of plastic film required compared to the plastic material used in vacuum forming operations and, in encasing contoured articles, utilization of the shrink-wrap material and method causes the film, quite often, to bridge the contoured surfaces of the encased article and not conform exactly to the surface as is required for maintaining the desired shape of the hoodliner.

To overcome the bridging tendency, a vacuum forming process could be used wherein the plastic film would be supported on a frame and heated to its softening temperature and then lowered into contact with an upper face of a contoured article. Holes in the mold would permit a vacuum to be applied, through the opposite side of the permeable contoured article, or the uncoated side, to draw a vacuum in the volume between the mold and the plastic film, drawing the film down onto the top surface of the article and conforming it to the exact contour thereof. This process would be effective to coat one face of the article; however, to coat the other face would require inverting the article in another mold, supporting it with a contoured surface conforming to that surface and again heating a film of plastic and applying it to the then top surface. However, to evacuate the volume between the last applied film and the mold would require piercing the previously applied film to be able to apply an appropriate vacuum to draw the film onto the article. As is evident, such a process requires a multiple step operation utilizing contoured molds and further requires the use of a relatively tough film capable of withstanding the stresses to which it is subjected during such handling and encapsulating process. Further, such method would typically leave the marginal edges of the hoodliner uncoated, thereby yielding an article that still exposed workers, through subsequent handling, to edge fibers from the hoodliner.

The aforementioned commonly assigned patent application discloses a method of encapsulating a molded fiber glass hoodliner using heat and vacuum to conform the plastic film onto the hoodliner; however, such method is not amenable to automated in-line production techniques and still requires undesirable manual operations.

SUMMARY OF THE INVENTION

The present invention provides a method and apparatus for encapsulating a contoured permeable article in a film of heat formable material in a continuous in-line automated process which includes the major steps of 1) positioning the article between two generally horizontally oriented continuous webs of plastic film, 2) attaching the article to at least one of the webs so they are moved as a unit thereafter, 3) securing the opposed webs into contact with each other around the entire outer periphery of the article to define a generally enclosed volume between the webs containing the article, 4) evacuating the air from within the enclosed volume, including the interior of the porous article while, or just subsequent to, 5) heating the plastic film forming the enclosed volume to its flow temperature, causing the plastic film to conform exactly to the contour of the article and, in areas of direct contact between the opposed plastic films, such as along the periphery of the article and within any internal opening through the article, fusing the opposed plastic films together. The evacuation preferably is carried out by piercing the bottom web of plastic film with hollow evacuating needles that project into and terminate within the permeable article. Thereafter the needles are withdrawn from the encapsulated article and the excess plastic film is trimmed from the fused marginal edges of the contoured article, including removal from any internal openings in the article.

In addition to the in-line encapsulation process, a main feature of the invention is to encapsulate a porous, contoured article in a film without the use of a supporting mold. The article is primarily supported instead by the lowermost web or sheet of plastic film between the pinched portions thereof during the evacuation of the enclosed volume and the fusing of the plastic film through the application of heat. This ability speeds the encapsulating process and considerably reduces its cost. However, during the heating step, the softening of the plastic requires additional support be provided. Such secondary support is provided by adjustable platforms secured to the evacuating needles.

Within the in-line process of encapsulation, the present invention further includes controlling the depth of penetration of the evacuation needles into the article. Again, an adjustable platform on each needle limits the needle penetration, and thereafter supports the article during the heating and evacuation steps.

The apparatus for accomplishing the above in-line steps includes movable frame members moveable into face-to-face engagement for forcing the top and bottom plastic films together in a horizontal position once the article has been disposed therebetween, and a vacuum manifold movably supporting a plurality of vertically projecting hollow evacuating needles, in fluid communication with the vacuum manifold. A platform or planar support means is adjustably positioned on each needle, generally subjacent the terminal piercing end thereof, which determines the depth of penetration of the needles into the molded article as the manifold is moved upwardly, forcing the needles to penetrate into the permeable article. The support means are predisposed such that the needles pierce the lower plastic film and project into strategically located areas of the permeable article without piercing the opposed upper plastic sheet and to provide support to the article during the heating cycle.

A heating chamber, having heating means, heats the plastic film to the flow temperature (which can be determined by observing the plastic film drumming-up because of the expansion of air within the enclosed volume, or which can be automatically timed or otherwise sensed) whereupon the volume between the opposed films is evacuated of air through the needles, causing the plastic films to intimately bond to either the molded article or to fuse together in those areas not separated by the article. A trimming press trims the excess plastic film from around all marginal edges, thereby yielding an encapsulated article.

Preferably, the contoured permeable article for this encapsulation process is formed of a fiber glass sheet; however, other permeable objects could also be encapsulated in accordance with this invention.

BRIEF DESCRIPTION OF THE DRAWINGS

FIG. 1B is a schematic elevational view similar to FIG. 1 showing the final operation in the "in-line" practice of the invention;

FIG. 3 is a transverse cross-sectional view taken along line 3—3 of FIG. 1;

DESCRIPTION OF THE PREFERRED EMBODIMENT

Figure 1:
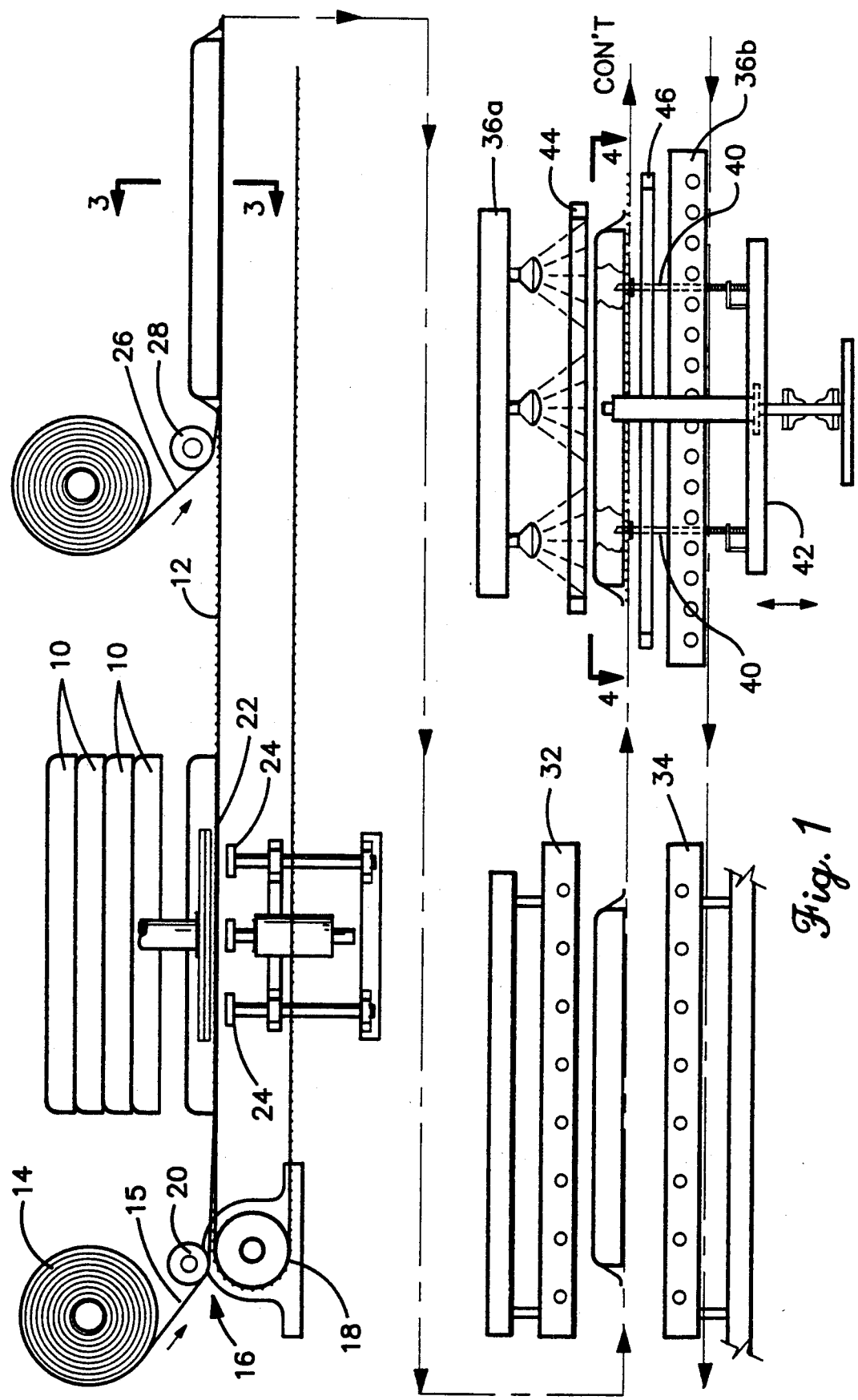
FIG. 1 is a schematic drawing illustrating the present invention, both process and apparatus, in a continuous "in-line" arrangement.

Reference will be made to FIG. 1 and FIG. 1B which, taken together, schematically illustrate the automatic apparatus and steps for practicing the invention in the environment of a continuous "in-line" manufacturing process for encapsulating a pre-formed article within an envelope, or in this instance, opposed sheets, of plastic film. However, it is to be understood that although the description refers to the automatic operation of the "in-line" process, each separate operation within such process could be accomplished at separate stations that are not "in-line" and with the transfer of the article to each station being done manually as opposed to the continuous feeding along an endless path as disclosed in FIG. 1 and FIG. 1B herein. Thus, as shown by the above identified Figures, the individual pre-formed articles 10, which in this instance are pre-molded fiber glass hoodliners, are disposed above a generally continuously running horizontal endless belt 12 in a vertical stack. A web of plastic film 15, such as polyethylene film, is fed from a first supply roll 14 onto the belt 12 at the upstream end thereof as at 16. In this instance, the belt 12, in fact, comprises two transversely spaced horizontal chains, spaced so as to engage the plastic film 15 adjacent the opposed edges. Thus, each chain includes teeth 18 projecting therabove so that, as the plastic film 15 is fed onto the belt 12, a pressure roll 20 presses each marginal edge of the film against the teeth to perforate the film and cause the film to be positively driven by the chain teeth 18. It is to be understood that each side chain 12 is synchronously driven so that both sides of the plastic film are moved in coordination with one another.

As the film 15 passes under the vertical stack of articles 10 it is temporarily stopped to permit the lowermost article in the stack to be dropped onto the plastic film in an area generally unsupported by any structure underneath the film 15. An indexing or aligning mechanism 22 is positioned over the film 15 and movably disposed so as to, in one position, contact some portion of the article 10 to appropriately position the article on the film in a predetermined relationship. A plurality of heat-staking heads 24 are reciprocally mounted subjacent the film in alignment with some portion of the article 10 supported thereon. The staking heads 24 are actuated once the article has been properly aligned on the film 15. Once actuated, the heated heads 24 are elevated to contact the underface of the film 15, pressing it into contact with an opposed portion of the underface of the article 10, thereby heat-staking the article 10 onto the film 15 so that thereafter the article 10 and the film 15 travel as a unit.

After heat-staking the article 10 to the lower web of film 15, the drive chain 12 is again actuated to advance the article 10 and film 15 to a station where an upper or top web of film 26 is supplied to cover the upper face of the article 10. As before, the margins or edges of the upper film are pressed and perforated by the teeth 18 on the chain 12 through another pressure roller 28 so that movement of the chain 12 causes the upper feed roll 30 to continue to feed plastic film 26. This arrangement can be seen more clearly in FIG. 3, wherein the teeth 18 carried by the chains 12 are shown after having pierced the edge portions of the upper and lower webs of plastic film.

The article 10, as sandwiched between the upper 26 and lower 15 layers of film, is driven, through the drive of the film, to the next station where opposed upper 32 and lower 34 heaters preheat the film above and below the article 10 for a predetermined period of time. These heaters 32, 34 can be any appropriate heaters although radiant heaters are preferred. From the preheat station the article 10 as sandwiched between the film is progressively driven to the next station which comprises the main heater 36 and evacuation device 38. In this heating and evacuating station, again there are opposed upper 36a and lower 36b heaters which are actuated when the article 10 arrives at a predetermined position therebetween along with opposed vertically movable frame members 44 and 46, one on each side of the article 10, which are moved toward each other to pinch the plastic films together about the perimeter of the article.

Figure 4:
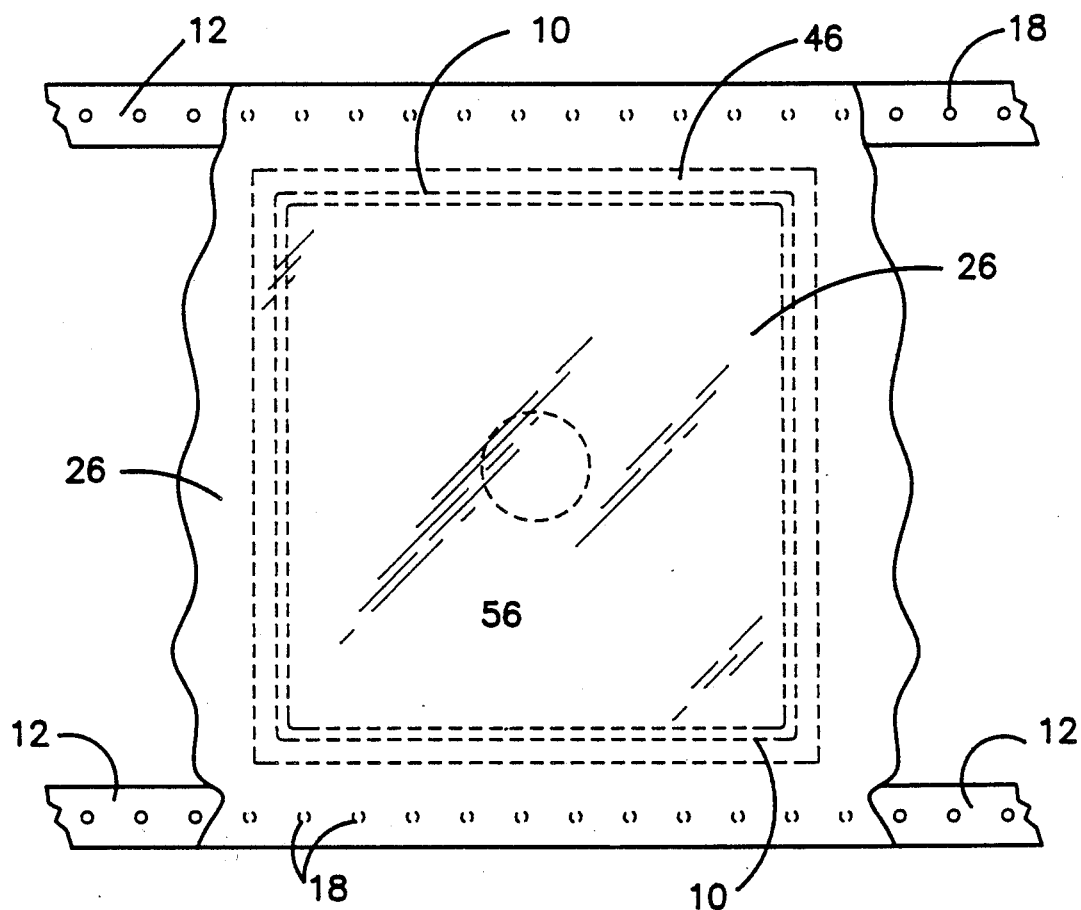
FIG. 4 is a plan view of the apparatus at the heating and evacuation station, taken along line 4—4 of FIG. 1, showing the relationship of the article and webs to the clamping frame.

The location of the article 10 and the edge portions of the upper and lower webs of film with respect to the lower frame member 46 is illustrated more clearly in FIG. 4. Since the frame members 44 and 46 are vertically aligned, it will be understood that the upper frame member 44 is similarly transversely spaced from the article 10 and the edge portions of the webs. Also, a plurality of vertically projecting vacuum needles 40 are reciprocally mounted below the lower film 15 and are attached to a vacuum header 42. The vacuum needles 40 are elevated to a position where they pierce the lower film 15 and project upwardly a predetermined distance to an intermediate position within the article 10 so that, upon the film 15 and 26 being heated to its softening or fusion temperature, the air within the volume occupied by the article between the opposed upper and lower films is evacuated, causing upper 26 and lower 15 films to be fused either to the article 10 or, in those areas where there is no article, to each other.

From the above identified heating and evacuating station, and with reference particularly to FIG. 1B, the article 10, as encapsulated within the plastic film 15 and 26, is moved to the final station wherein the plastic film is trimmed from the article 10 so that the final encapsulated article 10a, encased on all exposed surfaces within a plastic film, is freed from the excess film. To this end, reciprocal trim presses 48 and 50 are disposed on opposite sides of the article 10a with the presses having the exact outer dimensions and configuration as the article for trimming any flange or pinched edge portions of the film and for also trimming the plastic film from any interior openings within the article. It is to be understood that it is necessary to exactly dispose the article relative to the knife edges 48a of the reciprocal trim presses 48 and 50. Otherwise, the article 10a will be contacted by the knife edges and damaged thereby. Thus, it is important that the initial indexing of the article 10 on the lower film 15 as described in the first station be coordinated with the proper positioning of the article 10a in the trim presses 48 and 50. Upon the reciprocal trim presses completing their trimming operation, they are separated to permit the continued movement of the edge strips of the films 15 and 26 and the portions of the opposed film 15 and 26 remaining after the trimming operation has severed the article 10a from the web. The edge strips and remaining web portions are fed to a take-up roll 52 which, due to the engagement of the remaining web portions with the article 10a, moves the article 10a out of the presses 48 and 50 and onto a discharge chute 54 wherein the encased or encapsulated molded article 10a can be removed.

Figure 2:
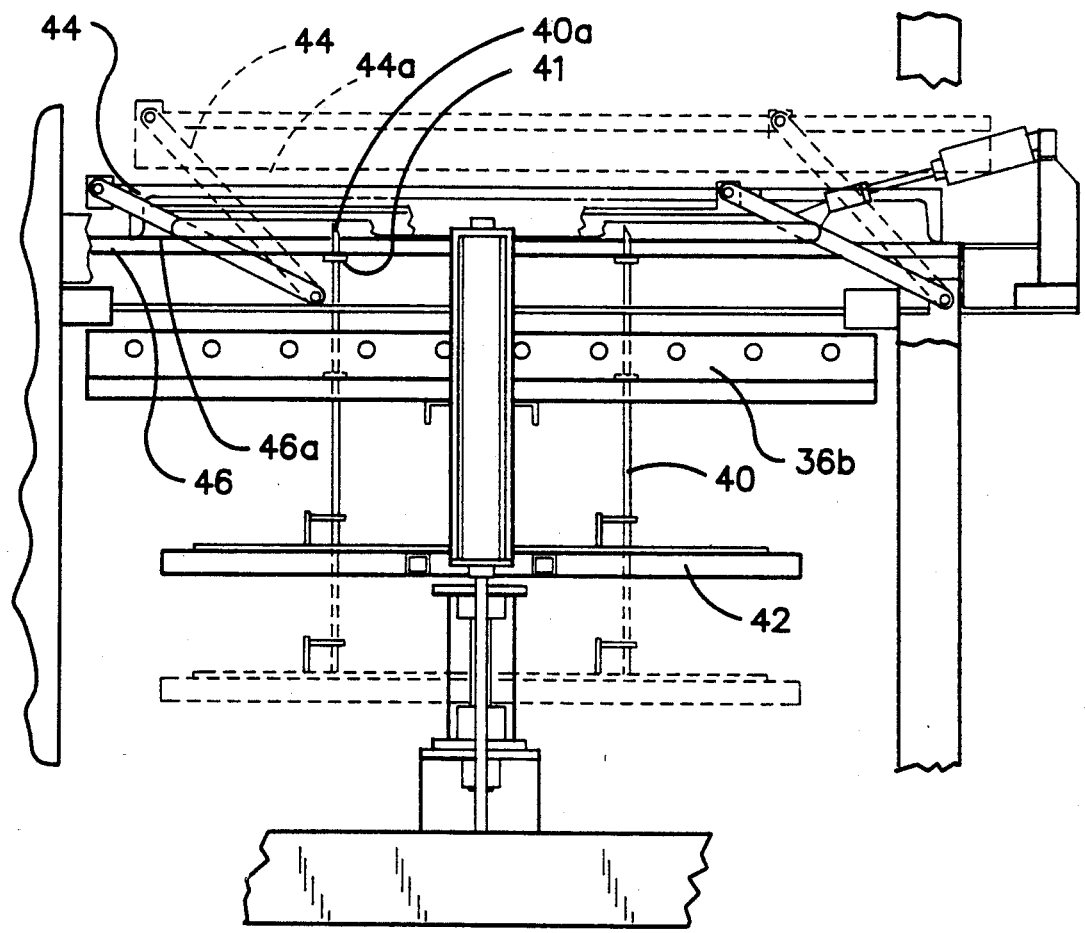
FIG. 2 is a schematic elevational view of an intermediate operation shown in FIG. 1 but further illustrating the heating and evacuation apparatus and steps of the present invention.

Referring now to FIG. 2, the heating and evacuation apparatus and procedure is more clearly shown and explained. As therein seen, the article 10, as sandwiched between the upper 26 and lower 15 plastic film, is properly positioned within the station, and the lower frame member 46 is elevated from below the lower film 15 to a position wherein an upper face 46a of the frame member 46 is in contact with the lower face of the lower film 15. Also, an upper reciprocal frame member 44 is likewise lowered to a position where a downwardly facing face 44a contacts the upper face of the upper film 26. It is to be understood that each frame member 44, 46 defines an outer frame of the same configuration, such as to completely surround and enclose the outer margins of the article 10. The opposed facing surfaces 44a, 46a are generally flat for engaging the respective surface of film and, when in final position, pinch the opposed film between these opposed surface to thereby define, within the confines of the frames 44, 46, a substantially airtight enclosure that includes therein the article as sandwiched between the upper and lower films 26, 15.

Figure 5:
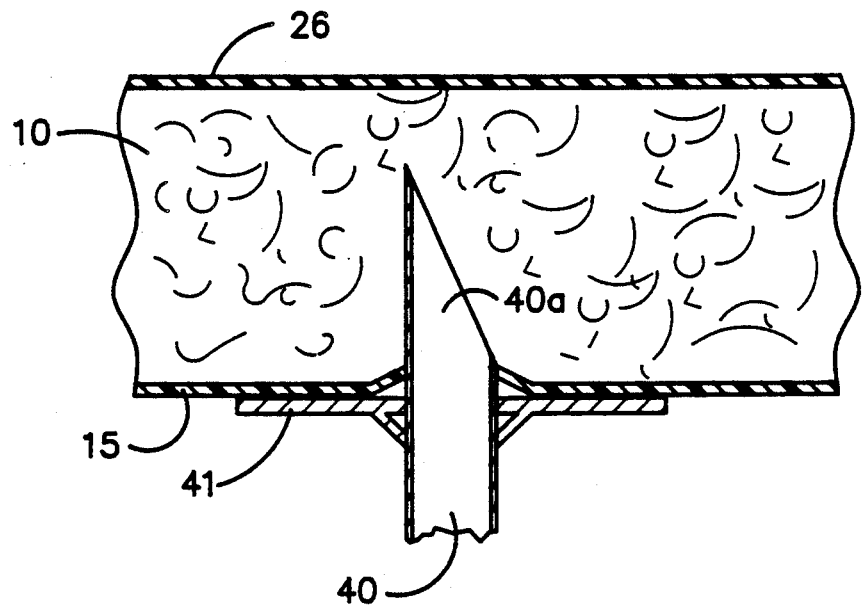
FIG. 5 is an enlarged cross-sectional view showing an evacuation needle disposed within the article.

With reference to FIG. 5, it is seen that the reciprocal vacuum probes or needles 40 also define adjacent their open end 40a, a platform 41 adjustably mounted thereon, such as a washer frictionally or threadably engaging the needle, which limits the depth of penetration of the needle through the lower film 15 and into the article 10 so that the final disposition of each needle is within the vertical thickness of the article 10. The platform on each needle is individually adjusted depending upon the thickness of the article at the position of penetration so that each needle 40 is prevented from extending through the article 10. As the washers 41 are adjustable on the needles, any thickness of article can be accommodated and the depth of penetration controlled to be disposed in an appropriate location within the article 10.

Once the needles are elevated to their final, penetrating position, the platforms provide support for the article, especially necessary during heating of the lower plastic film. It is again pointed out that the article 10 must be sufficiently permeable so that the volume defined between the opposed webs 15, 26 of film and as bounded by the opposed frame members can be evacuated by flow of air through the article 10. Further, the penetration of the needles through the lower film and article maintains the proper registry of the article on the lower film and prevents any relative movement therebetween that might occur upon softening of the fused heat-staking attachment.

Further, it is to be understood that during the fusion heating, the heat causes the air within the volume formed by the frames 44, 46 and the opposed plastic films 15 and 26 to expand so that, upon the plastic film obtaining its flow or softening temperature, the films 15 and 26 tend to drum up. It is normally at this point that the evacuation step is initiated to immediately draw the opposed films into intimate contact with the article 10 and fuse to either the marginal edges and the top and bottom surfaces thereof or fuse to the opposite film in those areas where the film is not separated by the article, such as completely around the marginal edge and within any openings formed in the article 10.

Figure 6:
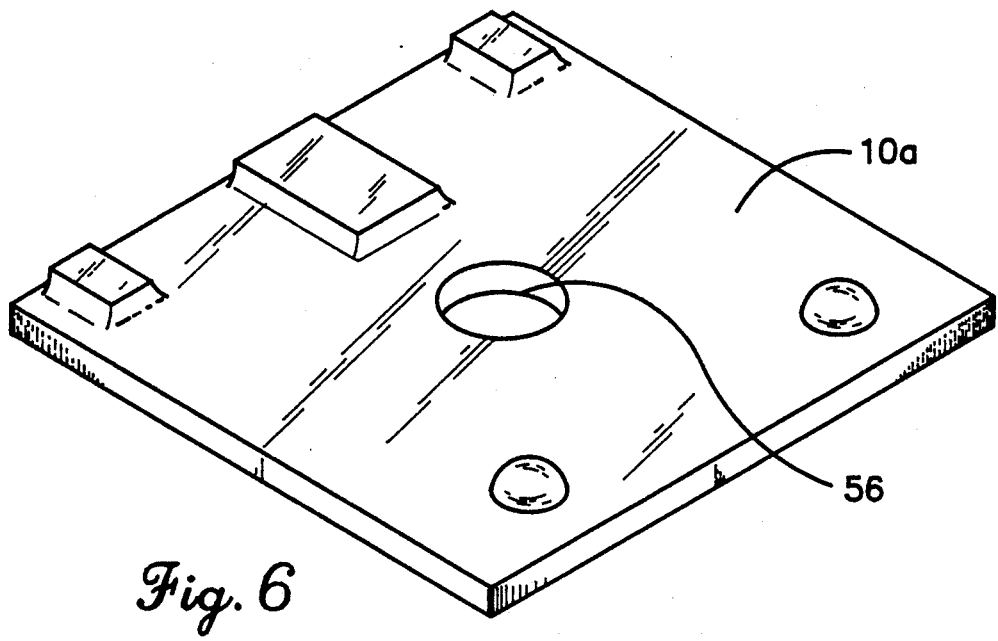
FIG. 6 is an isometric view of a finished encapsulated, molded article, to illustrate typical contours and openings of such an article.

The finished encapsulated article 10a is shown in FIG. 6. It has been found that encapsulation of an article 10 by the method described, even when such article has non-planar, contoured or abruptly discontinuous surfaces, forces the film into direct, intimate contact with all surfaces, thereby exactly duplicating the original article shape and configuration, without bridging (i.e., extending from one surface to an adjacent but displaced surface without engaging the contoured or sharp-angle surface joining such two displaced surfaces). Thus the true exterior contour of the article 10 as molded or otherwise shaped is reproduced in the item as encased hereby. Also, all marginal edges of the article are covered by a layer of film, and the trimming can occur substantially immediately adjacent such marginal edges to eliminate any double-layer plastic flange or seam. Edges of interior openings such as at 56 formed in the article are also covered with the film.

The reference in the claims to first and second surfaces of the porous article engaged by the lower and upper webs of plastic film should not be construed as limiting the article to any particular shape. Even an article of complex shape will have all of its surfaces ultimately adhered to either the upper or lower web of plastic film. Thus the designation of all the surfaces which are adhered to the lower web as the first surface and the designation of all the surfaces which are adhered to the upper web as the second surface is merely a convenient means of including all the surfaces of an article whose shape may be simple or complex.

As previously stated, the method and apparatus of this invention are specifically suited for automatically, in an in-line continuous process, encapsulating preformed, porous, permeable articles so that the air evacuating probe or needles can be positioned within the article, and the air within the envelope containing the article (as defined by the opposed plastic films) can be evacuated from all sides and faces of the article by flowing through the article and into the probe. The process further supports the article without the necessity of nesting in a mold or the like.

It is acknowledged that in the finished form one face of the encapsulated article has small puncture openings which during the process were occupied by the probes projecting therethrough. However, such openings are generally not apparent and are acceptable in the finished article as none of the fibrous material forming the article, or dust within the article, is able to be expelled from or exit such openings. Also, such openings are normally placed on a surface that is not viewed when the article is assembled in its final position, or can be subsequently covered by another aesthetically attractive outer layer. Thus it is seen that the method and apparatus of the present invention are particularly suited for use with a fibrous or porous article that permits relatively easy air flow therethrough and also must have some initial rigidity to prevent, under the evacuation of the air therefrom, distortion or compression of its initial configuration. Such system is particularly well suited to a pre-molded fiber glass article such as a hoodliner as previously mentioned. Although polyethylene film has been given as one example of plastic film which may be used in the invention, it will be obvious that other plastic films can be utilized as well.

What is claimed is:

1. A continuous method of encapsulating a contoured generally porous article within a plastic film, comprising the steps of:

moving a lower web of plastic film in a downstream direction;

causing at least a portion of a first surface of the article to engage the lower web and the article to be moved with the lower web;

covering the article with an upper web of plastic film, wherein the upper web engages at least a portion of a second surface of the article, and moving the upper and lower webs as a unit;

forcing the upper and lower webs together generally adjacent the periphery of the article to form an enclosed volume therebetween containing the article;

heating the upper and lower webs of plastic film in the area associated with the article to a predetermined fusing temperature at which the films are capable of adhering to said article and to each other;

piercing one of the webs to form an opening therein;

evacuating air from the enclosed volume through the opening to cause the upper and lower webs to engage and conform to the shape of the article and to engage each other in areas unobstructed by the article, wherein the heated lower web adheres to the first surface of the article, the heated upper web adheres to the second surface of the article, and the heated upper and lower webs fuse together in the engaged areas; and trimming the fused webs of film adjacent the periphery of the article.

2. The method of claim 1, wherein the moving webs are intermittently moved, the movement of the webs being halted during the evacuation and trimming steps.

3. The method of claim 1, wherein the lower web is moved by gripping the edge portions thereof and moving the gripped edge portions in said downstream direction.

4. The method of claim 3, wherein the upper and lower webs are moved as a unit by engaging the edge portions of the upper web with the edge portions of the lower web and causing the gripping and movement of the edge portions of the lower web to also grip and move the edge portions of the upper web.

5. The method of claim 1, wherein causing the article to engage the lower web includes the step of depositing the article onto the lower web and securing the article thereto.

6. The method of claim 5, wherein the article is secured to the lower web by heating predetermined portions of the lower web, which are in contact with the article, to the fusing temperature of the plastic film to cause the article to adhere to the lower web at said portions.

7. The method of claim 5, wherein the lower web is generally unsupported between the edge portions thereof and the article is transported by the unsupported portions of the lower web; and wherein said heating step includes supporting the article at spaced individual locations with individual support members.

8. The method of claim 1, wherein said one web is pierced and air is evacuated from the enclosed volume containing the article by inserting a relatively narrow tube through one of the webs and into the body of the porous article so as to be disposed within said article, and applying a vacuum to the tube, said disposition of said tube being limited by platform means secured to said tube.

9. The method of claim 8, wherein the tube is removed from the article prior to the step of trimming the fused webs of film.

10. Apparatus for continuously encapsulating a contoured generally porous article within a plastic film, comprising:

means for moving a lower web of plastic film in a downstream direction;

means for causing at least a portion of a first surface of the article to engage the lower web;

means for covering the article with an upper web of plastic film whereby the upper web engages at least a portion of a second surface of the article, said means for moving the lower web moving the upper and lower webs as a unit;

means for forcing portions of the upper and lower webs together generally adjacent the periphery of the article to form an enclosed volume containing the article;

means for heating the upper and lower webs of plastic film to a predetermined fusing temperature at which the films are capable of adhering to said article and to each other;

means for piercing one of the webs to form an opening therein;

means for evacuating air from the enclosed volume through the opening to cause the upper and lower webs to engage and conform to the shape of the article, to engage each other in areas unobstructed by the article, to adhere to the second surface and the first surface respectively and to fuse together in the engaged areas;

means for supporting said article without the use of a supporting mold by supporting the lower web at multiple spaced locations directly beneath the article during the heating of said films; and means for trimming the fused webs of film adjacent the periphery of the article.

11. The apparatus of claim 10, wherein the means for moving the lower web comprises means for gripping the edge portions thereof and moving the gripped edge portions in said downstream direction.

12. The apparatus of claim 11, wherein the means for gripping the edge portions of the lower web comprises teeth for piercing the edge portions of the lower web and means for moving the teeth in a downstream direction.

13. The apparatus of claim 12, wherein the means for moving the teeth comprise endless chains to which the teeth are attached.

14. The apparatus of claim 13, wherein the means for moving the upper and lower webs as a unit comprises means for feeding the edge portions of the upper web into contact with the teeth, whereby the teeth pierce said edge portions of the upper web in addition to the edge portions of the lower web to move both webs together in said downstream direction.

15. The apparatus of claim 10, wherein the means for causing the article to engage the lower web comprises means for periodically depositing an article onto the lower web, and wherein the means for heating comprises means for heating spaced locations on the lower web which are in contact with the article to the fusing temperature of the plastic film to cause the plastic film of the lower web to adhere to the article at said spaced locations.

16. The apparatus of claim 10, wherein the lower web is generally unsupported between the edge portions thereof, the article being carried by the unsupported portions of the lower web.

17. The apparatus of claim 10, wherein the means for evacuating air from the enclosed volume containing the article comprises means for inserting a relatively narrow tube through one of the webs and into the body of the porous article, and means for applying a vacuum to the tube.

18. The apparatus of claim 17, wherein the means for inserting a relatively narrow tube through one of the webs and into the body of the porous article comprises means for inserting a plurality of tubes through the lower web, and wherein the means for supporting the lower web directly beneath the article comprises an adjustable platform connected to each tube at a predetermined distance from the end of the tube, so that when the platform contacts the lower web beneath the bottom face of the article the tube is prevented from further penetration into the article and the platform assists the web in supporting the article.

19. The apparatus of claim 10, including means for winding up the remaining portions of the web after the trimming operation, movement of the remaining portions of the web pushing the trimmed encapsulated article to a downstream station.

20. A method of encapsulating a contoured, generally porous article in a plastic film without the use of a supporting mold, comprising the steps of:

disposing said article between opposed sheets of plastic film, one of said sheets being in a generally lowermost position and the other sheet being in a generally uppermost position relative to each other;

pinching said sheets together generally adjacent the periphery of said article to form an enclosed volume containing said article;

heating said sheets to a predetermined fusing temperature capable of causing said sheets to adhere to the article or to one another;

during heating supporting said article without the use of a supporting mold by supporting the lowermost sheet at multiple spaced locations directly beneath the article;

evacuating the enclosed volume and the interior of said porous article by inserting a tube into said article for air flow communication exteriorly of the enclosed volume and applying a vacuum to the tube, thereby causing said plastic sheets to intimately engage the surfaces of said article and assume the same contour as the article;

lowering the temperature of the plastic sheets below their predetermined fusing temperature; and trimming the fused sheets adjacent the periphery of the article.

21. The method of claim 20, wherein the tube is inserted through one of the plastic sheets, and wherein the tube is removed from the article and the enclosure prior to trimming the fused sheets.

22. Apparatus for encapsulating a contoured, generally porous article in a plastic film without the use of a supporting mold, comprising:

means for maintaining said article between opposed sheets of plastic film, one of said sheets being in a generally lowermost position and the other sheet being in a generally uppermost position relative to each other;

means for forcing said sheets together generally adjacent the periphery of said article to form an enclosed volume containing said article;

means for heating said sheets to a predetermined fusing temperature capable of causing said sheets to adhere to the article or to one another;

means for supporting said article without the use of a supporting mold by supporting the lowermost sheet at multiple spaced locations directly beneath the article while said article and plastic sheets are being heated;

means for inserting a tube into said article for air flow communication exteriorly of the enclosed volume and applying a vacuum to the tube, to evacuate the enclosed volume and the interior of said porous article, and to cause said plastic sheets to intimately engage the surfaces of said article and assume the same contour as the article;

means for lowering the temperature of the plastic sheets below their predetermined fusing temperature; and means for trimming the fused sheets adjacent the periphery of the article.

23. The apparatus of claim 22, including means for removing the tube from the article and the enclosure prior to the trimming of the fused sheets.

* * * * *